US010630399B2

(12) United States Patent
Carpenter

(10) Patent No.: US 10,630,399 B2
(45) Date of Patent: Apr. 21, 2020

(54) TESTING DISTRIBUTED APPLICATIONS THAT HAVE AN ESTABLISHED EXCHANGE IN AN ADVANCED MESSAGE QUEUING PROTOCOL (AMQP) MESSAGE BROKER

(71) Applicant: DELL PRODUCTS, L.P., Round Rock, TX (US)

(72) Inventor: Donal Carpenter, Wicklow (IE)

(73) Assignee: Dell Products, L.P., Round Rock, TX (US)

( * ) Notice: Subject to any disclaimer, the term of this patent is extended or adjusted under 35 U.S.C. 154(b) by 370 days.

(21) Appl. No.: 15/587,791

(22) Filed: May 5, 2017

(65) Prior Publication Data

US 2018/0324222 A1  Nov. 8, 2018

(51) Int. Cl.
| | |
|---|---|
| *G01D 3/00* | (2006.01) |
| *G01P 21/00* | (2006.01) |
| *H04B 17/19* | (2015.01) |
| *H04L 29/08* | (2006.01) |
| *G06F 11/36* | (2006.01) |

(52) U.S. Cl.
CPC ......... *H04B 17/19* (2015.01); *G06F 11/3688* (2013.01); *H04L 67/26* (2013.01); *H04L 67/2809* (2013.01); *H04L 67/327* (2013.01)

(58) Field of Classification Search
CPC ..... H04B 17/19; G06F 11/3688; H04L 67/26; H04L 67/2809; H04L 67/327
USPC ........................................................ 702/108
See application file for complete search history.

(56) References Cited

U.S. PATENT DOCUMENTS

| | | | |
|---|---|---|---|
| 7,974,966 B2 | 7/2011 | Robie | |
| 8,751,639 B2 | 6/2014 | Griffiths | |
| 9,021,131 B2 | 4/2015 | Ross | |
| 9,313,159 B2 | 4/2016 | Ross | |
| 9,665,411 B2 | 5/2017 | McGrath et al. | |
| 2014/0059226 A1* | 2/2014 | Messerli | G06F 9/5072 709/226 |
| 2014/0215057 A1* | 7/2014 | Walsh | H04L 67/025 709/224 |

(Continued)

OTHER PUBLICATIONS

NServiceBus Ltd. dba Particular Software, Step by Step Sample, https://www.nuget.org/packages/NServiceBus/) (6.x), 2010.

*Primary Examiner* — Michael P Nghiem
(74) *Attorney, Agent, or Firm* — Isidore PLLC

(57) ABSTRACT

A method for testing a distributed application. The method includes receiving the automation test code and initiating execution of the automation test code. A responsive event provided by at least one distributed application node, in response to execution of the automation test code is detected. One or more messages having a specified routing key are received as the responsive event. A queue for receiving the one or more messages generated on an advanced message queuing protocol message broker. A test context specific binding key having a known entity identifier and the specified routing key is selectively generated to form a bind between the queue and an established exchange. The one or more messages having a payload that selectively indicates the nature of the state change associated with the predetermined distributed event type are received at the queue. The one or more messages are selectively provided to a requesting device having access to the queue.

20 Claims, 6 Drawing Sheets

(56) References Cited

U.S. PATENT DOCUMENTS

2014/0215443 A1\* 7/2014 Voccio ................ G06F 11/3612
                                                     717/128
2016/0261395 A1\* 9/2016 Agarwal ................. H04L 67/06
2018/0278551 A1\* 9/2018 Carpenter ........... H04L 49/9094

\* cited by examiner

FIG. 4

Processing Module 400

MessageOrientatedTestBuilder.New — 402
    .WhenThisHappens (() => {

// initiate workflow by calling API for System Under Test

}}
.ThenExpectThisMessage<OrderCreatedEvent> (e => e.PurchaseOrderNumber == "PO12345") — 404
.ThenThisHappens (() => {

//mock external "Order Processing" system accepting order and processing it, and updating status }} — 406, 408
.ThenExpectThisMessage<OrderStatusChangeEvent> (e => e.PurchaseOrderNumber == "PO12345" && e.Status ==INPROCESS)
.ThenThisHappens (() => {

//mock external "Invoicing" system sending invoice and updating order status

}} — 410
.ThenExpectThisMessage<OrderStatusChangeEvent> (e => e.PurchaseOrderNumber == "PO12345" && e.Status == INVOICED)
.ThenAssert (() => {

// perform final verification in System Under Test to assert expectations

}};

TESTING DISTRIBUTED APPLICATIONS THAT HAVE AN ESTABLISHED EXCHANGE IN AN ADVANCED MESSAGE QUEUING PROTOCOL (AMQP) MESSAGE BROKER

1. CROSS-REFERENCE TO RELATED APPLICATION

This application is related to copending U.S. patent application Ser. No. 15/470,884, filed Mar. 29, 2017, which disclosure is hereby incorporated by reference.

2. TECHNICAL FIELD

The present disclosure generally relates to distributed systems and in particular to testing asynchronous distributed applications in an asynchronous distributed system.

3. DESCRIPTION OF THE RELATED ART

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often communicatively connected as computer nodes to form a distributed computer system. In an asynchronous distributed system, the network of computer nodes may execute a software application as a single coherent system. However, each computer node is independently capable of processing information, with respect to the software application. There is no global clock nor consistent clock rate in common with the computer nodes in the asynchronous distributed system, therefore information may be processed at different times and at various rates. Data that is associated with the same task is often spread out over more than one computer.

The difficulties in testing software applications for asynchronous distributed systems is more complicated than accounting for clock rate difference. Computer nodes within the distributed computer system may be associated with users of differing companies or accounts, different disks with different software packages, different hardware resources, and uneven performance capabilities. Each of these different aspects must be considered when attempting to foresee failure conditions and/or circumstances when programming asynchronous distributed applications. As the algorithm of an asynchronous distributed application becomes more complex, it is exponentially more difficult to determine how to test the algorithm to ensure successful execution of the asynchronous distributed application over multiple computer nodes.

BRIEF SUMMARY

Disclosed are an information handling system (IHS) and a method performed within an IHS for testing a distributed application. The method includes receiving the automation test code. The method further includes initiating execution of the automation test code for making application programming interface calls against a distributed application for testing the distributed application. The method then includes detecting a responsive event provided by at least one distributed application node, in response to execution of the automation test code. The method includes receiving one or more messages having a specified routing key as the responsive event. A queue for receiving the one or more messages associated with a predetermined distributed event type is generated on an advanced message queuing protocol (AMQP) message broker. Further, a test context specific binding key having a known entity identifier and the specified routing key is selectively generated juxtapose to generating the queue. The test context specific binding key forms a bind between the queue and an established exchange associated with the AMQP broker. The method further includes receiving at the queue the one or more messages having a payload that selectively indicates the nature of the state change associated with the predetermined distributed event type. The one or more messages are selectively provided to a requesting device having access to the queue.

According to another embodiment, the IHS includes a processor communicatively coupled to an advanced message queuing protocol (AMQP) message broker, and which executes a behavior driven testing module (BDTM) to enable the processor to receive automation test code, and initiate execution of the automation test code for making an application programming interface call against a distributed application for testing the distributed application. The processor detects a responsive event provided by at least one distributed application node, in response to execution of the automation test code. As the responsive event, the processor receives one or more messages having a specified routing key. Further, the processor generates, on an advanced message queuing protocol (AMQP) message broker, a queue for receiving the one or more messages associated with a predetermined distributed event type. The processor selectively generates a test context specific binding key having a known entity identifier and the specified routing key, juxtapose to generating the queue, where the test context specific binding key forms a bind between the queue and an established exchange associated with the AMQP broker. The one or more messages having a payload that selectively indicates the nature of the state change associated with the predetermined distributed event type are received at the queue. Then the processor selectively provides the one or more messages to a requesting device having access to the queue.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 4 is an example processing module illustrating a sequence of processing events for a distributed application testing algorithm, in accordance with one embodiment;

DETAILED DESCRIPTION

Figure 1:
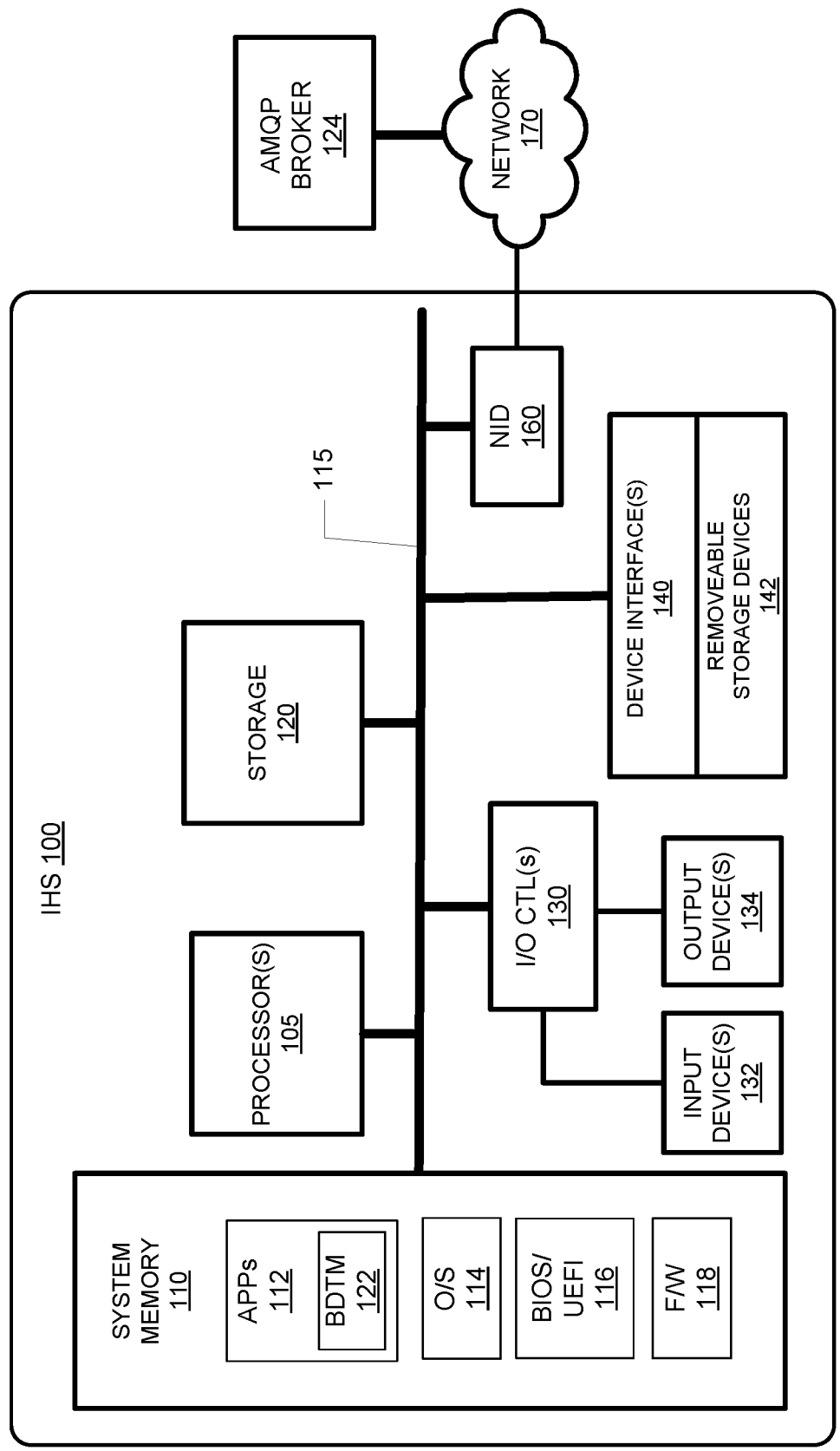
FIG. 1 illustrates an example information handling system within which various aspects of the disclosure can be implemented, according to one or more embodiments.

The illustrative embodiments provide an information handling system (IHS) and a method performed within an IHS for testing a distributed application. According to one aspect, the processor receives the automation test code. Execution of the automation test code is initiated for making application programming interface calls against a distributed application for testing the distributed application. A responsive event provided by at least one distributed application node is detected, in response to execution of the automation test code. One or more messages having a specified routing key are received as the responsive event. A queue for receiving the one or more messages associated with a predetermined distributed event type is generated on an advanced message queuing protocol (AMQP) message broker. Further, a test context specific binding key having a known entity identifier and the specified routing key is selectively generated juxtapose to generating the queue. The test context specific binding key forms a bind between the queue and an established exchange associated with the AMQP broker. Further the one or more messages are received at the queue. The one or more messages have a payload that selectively indicates the nature of the state change associated with the predetermined distributed event type. The one or more messages are selectively provided to a requesting device having access to the queue.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing module, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Those of ordinary skill in the art will appreciate that the hardware, firmware/software modules, and software components and basic configuration thereof depicted in the following figures may vary. For example, the illustrative components of IHS 100 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, there is illustrated example IHS 100 and a device having an advanced message queuing protocol (AMQP) message broker 124. Example IHS 100 includes one or more processor(s) 105 coupled to system memory 110 via system interconnect 115. System interconnect 115 can be interchangeably referred to as a system bus, in one or more embodiments. Also, coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including application(s) 112, operating system (O/S) 114, basic input/output system/unified extensible firmware interface (BIOS/UEFI) 116, other firmware (F/W) 118, and behavior driven testing module (BDTM) 122.

The various software and/or firmware modules have varying functionality when their corresponding program code is executed by processor(s) 105 or other processing devices within IHS 100. IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 140, such as, without limitation, an optical reader, a card reader, Personal Computer Memory Card International Association (PCMCIA) port, and/or a high-definition multimedia interface (HDMI), can be associated with IHS 100. Device interface(s) 140 can be utilized to enable data to be read from, or stored to, corresponding removable storage device(s) 142, such as a compact disk (CD), digital video disk (DVD), flash drive, or flash memory card. In one or more embodiments, device interface(s) 140 can also provide an integration point for connecting other device(s) to IHS 100. Device interface(s) 140 can further include General Purpose I/O interfaces such as $I^2C$, System Management Bus (SMBus), and peripheral component interconnect (PCI) buses, et al.

IHS 100 further comprises a network interface device (NID) 160. NID 160 enables IHS 100 to communicate and/or interface with other devices, services, and components that are located external to IHS 100, for example, AMQP message broker 124. AMQP message broker 124 is an open standard application layer protocol for message-queuing communications. These devices, services, and components can interface with IHS 100 via an external network, such as example network 170, using one or more communication protocols. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

In one embodiment, during boot-up or booting operations of IHS 100, processor 105 selectively loads BDTM 122 to system memory 110 for testing a distributed application, and more specifically an asynchronous distributed application. Additional aspects of BDTM 122 and functionality associated thereof, are presented within the description of FIGS. 2-5.

Figure 2:
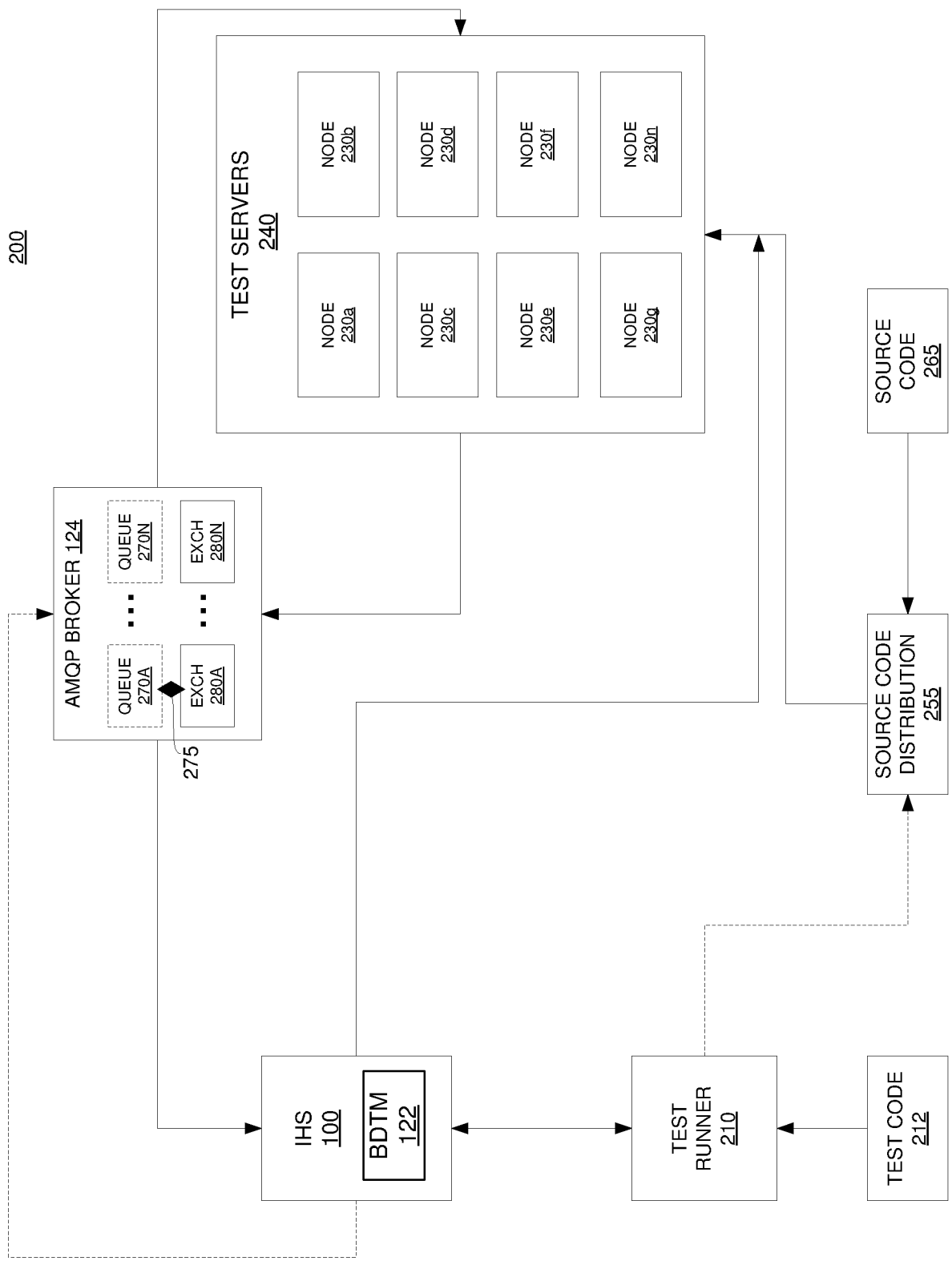
FIG. 2 illustrates an example distributed application testing system in accordance with one embodiment.

With reference now to FIG. 2, there is illustrated an example distributed application testing system, represented as distributed system 200. Distributed system 200 includes IHS 100, AMQP message broker 124, test servers 240, test runner 210, automation test code 212, source code distribution point 255, and source code 265. IHS 100 includes BDTM 122. Included within AMQP message broker 124 are test context specific binding key 275, queue 270a-270n, where n is a finite variable, and exchange 280a-280n, where n is a finite variable. Distribution node 230a-230n, where n is a finite variable, are included in test servers 240. Each component of distributed system 200 may be located, for instance, at a location remote to the other.

In the described embodiments, IHS 100 operates as a test agent. As the test agent, IHS 100 is a client to test servers 240, accessing the distributed applications thereof. Additionally, IHS 100 operates as a subscriber of AMQP message broker 124, selectively receiving one or more messages as provided by AMQP message broker 124. BDTM 122 enables processor 105, of IHS 100, to generate at least one queue on AMQP message broker 124, for example queue 270a. Queue 270a has a known event message type and entity identifier for receiving one or more messages from at least one distribution node 230. Test servers 240 include distribution nodes 230a-n which are a number of virtual machines and/or physical computer devices that form a simulated asynchronous distribution environment. Test servers 240 are utilized to run distributed applications that usually include an application programming interface (API). Source code 265 is generated by developing engineers and distributed to test servers 240 at source code distribution 255. Automation test code 212, created by automation test engineers, is received at test runner 210 and provided to IHS 100. Automation test code 212 provides, via IHS 100, programmatic commands to at least one distributed application node 230a from among the plurality of distributed application nodes 230a-n. An Application Programming Interface (API) is utilized to provide the programmatic commands to distributed application running on a node 230.

AMQP message broker 124 is a service bus that implements a messaging protocol which provides predefined rules, formats, and functions for exchanging messages between IHS 100 and distributed application nodes within test servers 240. Exchange 280a-n is an entity, established on AMQP message broker 124, that receives and routes a message to an identified messaging queue, e.g., one of queue 270a-n. AMQP message broker 124 includes a number of messaging queues, for example queue 270a-n. In one embodiment, queue 270a-n is established by IHS 100. In another embodiment, at least one of queue 270a-n is established by another requestor or computer system having a known distributed event type and entity identifier (not shown). The predefined rules provided by AMQP message broker 124 are established to selectively bind queue 270a-n to exchange 280a-n utilizing a binding key. Every message that is sent to queue 270a-n has a routing key.

In operation, IHS 100 generates at least one queue 270a-n on AMQP message broker 124. Queue 270a-n are created to receive messages for a known distributed event type and entity identifier. The predetermined distributed event type defines a type of event being simulated within the testing environment of test servers 240. For example, the distributed event type can be a purchase, manufacturing, and/or processing related event type, where distributed applications executing on test servers 240 simulate an environment for monitoring the process from initiation to completion. IHS 100 executes automation test code 212 against at least one distributed application node 230a, from among the plurality of distributed application nodes 230a-n. Executing automation test code 212 against distributed application node 230a enables execution of the distributed application for the purpose of testing to be initiated. IHS 100 generates a test context specific binding key 275 that is formed, in part, from the known entity identifier and a specified routing key. When executing, the distributed application generates one or more messages related to an event that occurred for an entity. Each of these messages will contain a routing key that is made up of the type of event messages and identifiers for the entity. The test context specific binding key 275 is formed based on the content of the specified routing key. The test context specific binding key 275 forms a bind between at least one of queue 270a-n and a corresponding exchange 280a-n, for example queue 270a and exchange 280a, associated with AMQP message broker 124.

During execution, one or more distributed event messages are sent from distributed application node 230a-n to AMQP message broker 124. IHS 100 detects a responsive event that is provided by the at least one distributed application node 230a in response to execution of the testing automation test code 212 against the distributed application for purpose of performing distributed testing of the distributed application. In response to detecting the responsive event messages, IHS 100 provides notification to the automated test code such that the execution can continue to the next step in the tests.

In one embodiment, the responsive event is a domain entity state change. To detect the responsive event, IHS 100 receives one or more messages that identify the resulting domain entity state change for the predetermined distributed event type. Accordingly, one or more messages associated with the distributed event are provided to AMQP message broker 124. AMQP message broker 124 provides the distributed event to each queue 270a-n that is bound by test context specific binding key 275. In response to identifying the resulting domain entity state change, IHS 100 generates a sequence of continuation steps in the form of automation test code 212 to provide to AMQP message broker 124. IHS 100 provides the continuation steps in the form of automation test code 212 to execute against at least one distributed application node 230a to generate a subsequent domain entity state change. Additionally, AMQP message broker 124 may provide the distributed event to the distributed application and/or another requesting application.

In one embodiment, IHS 100 receives automation test code 212 as a series of discrete operations. In response to IHS 100 receiving automation test code 212, IHS 100 selectively arranges automation test code 212 to be executed against at least one distributed application node 230a-n. Distributed application node 230a-n assesses at least one functional feature of the distributed application. The at least one functional feature is dynamically detected by the at least one distributed application node 230a-n. In response to execution of the series of discrete operations, a responsive message associated with each event of a series of distributed events is dynamically received at queue 270a. In response to receipt of the responsive message at queue 270a, IHS 100 executes subsequent discrete automation test code operations against the distribution application node 230n. IHS 100 generates a subsequent queue, for example queue 270n and binding 275, to receive subsequent messages from exchange 280n, where "a" represents an initial variable and "n" is a finite variable.

Figure 3:
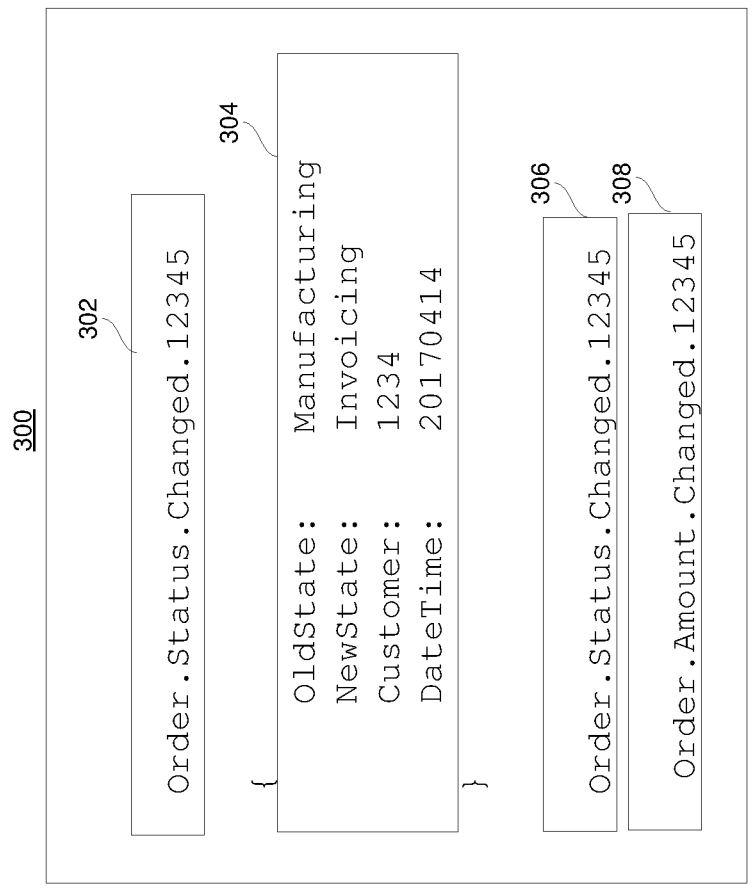
FIG. 3 illustrates example parameters for binding a message to an exchange, in accordance with one embodiment.

FIG. 3 illustrates example parameters for binding a message to an exchange. Example message 300 includes routing key 302, message body 304, test context specific binding key 306, and second test context specific binding key 308.

In operation, IHS 100 establishes queue 270a-n to receive any message having a specified routing key, for example routing key 302. In one embodiment, a single queue 270a is established. In another embodiment, multiple queues 270a-n are established. Any message 300 published by test servers 240 to AMQP message broker 124 is first sent to an exchange (280a). AMQP message broker 124 keeps a list of all exchanges within AMQP message broker 124. Each queue from among queue 270a-n is bound to exchange 280a-n via test context specific binding key 306. Each message published by test servers 240 includes routing key 302. AMQP message broker 124 detects when IHS 100 registers to receive a specified distributed event type and identifies the queue in which to route the corresponding message.

In one embodiment, processor 105 executes BDTM 122 to generate test context specific binding key 306 having properties that correspond to a specified, or predetermined distributed event, as well as the known entity identifier. The known entity identifier associated with binding key 306 designates which one of queue 270a-n receives message body 304. Processor 105 generates test context specific binding key 306 to selectively assign to message 300. In another embodiment, test context specific binding key 306 is generated from a specified routing key having a dynamically identified component that is associated with the predetermined distributed event. The dynamically identified component is replaced with a parameter that corresponds to a known entity associated with predetermined distributed event. In still another embodiment, message 300 includes one or more text context specific binding key, for example text context specific binding keys 306 and 308. Responsively, preselected information associated with itemized status of the specified distributed event type is provided to a corresponding entity identified by the entity identifier.

FIG. 4 is an example processing module illustrating a sequence of processing events for a distributed application testing algorithm. Processing module 400 includes test segment 402, queue, exchange, and binding defining segment 404, continuation segment 406, subsequent queue, exchange, and binding defining segment 408, and assertion segment 410.

In one embodiment, test segment 402, queue, exchange, and first binding defining segment 404, continuation segment 406, subsequent queue, exchange, and second binding defining segment 408, and assertion segment 410 are each example segments of code that form processing module 400. Processing module 400 is executed in a distributed application testing environment. For example, IHS 100 initiates execution of processing module 400 for making API calls against a distributed application for testing the distributed application. Test runner 210 executes processing module 400. Executing processing module 400 within a system such as distributed system 200 enables simulation of "real-world" asynchronous distributed application communications. Processor 105 having BDTM 122 generates processing module 400 to provide programmatic commands to at least one distributed application node 230 via the API, from among a plurality of distributed application nodes 230*a-n*.

In another embodiment, processing module 400 executes the workflow associated with the distributed application by executing Application Programming Interface at test segment 402. Queue, exchange, and first binding defining segment 404 is executed first and defines exchange and binding information for a specified distributed event on the AMQP Broker. Processor 105 establishes a queue to bind to the exchange utilizing the predefined binding key provided within queue exchange and first binding defining segment 404. The automation code in segment 402 is then executed and a message is received at the exchange in response to a domain entity state change associated with testing of the distributed application (or system under test). Consequently, second binding defining segment 408 is executed to set up the new AMQP queue, exchange, and binding definition and then continuation segment 406 is executed against the test servers 240 to continue testing of the distributed application. In response to detecting a subsequent domain entity state change, processor 105 provides a corresponding subsequent operation to the automation test code. The subsequent operation includes, for example, a continuation step or an assertion step.

In another embodiment, in response to receipt of a responsive message signifying detection of a domain entity state change, processing module 400 includes subsequent discrete operations for execution against distribution application node 230*a-n*. The subsequent discrete operations are provided in the form of automated test code for continued testing of the distributed application. Additionally, subsequent queue, exchange, and second binding defining segment 408 provides automation code for generating a subsequent queue to provide subsequent messages from an established exchange. In one embodiment, additional subsequent queues and corresponding exchange bindings are established in processing module 400 to output messages having a payload that selectively indicates the nature of the state change associated with the distributed event type. In response to all expected messages being received for a distributed event type, assertion segment 410 is executed as a final assertion step.

Figure 5:
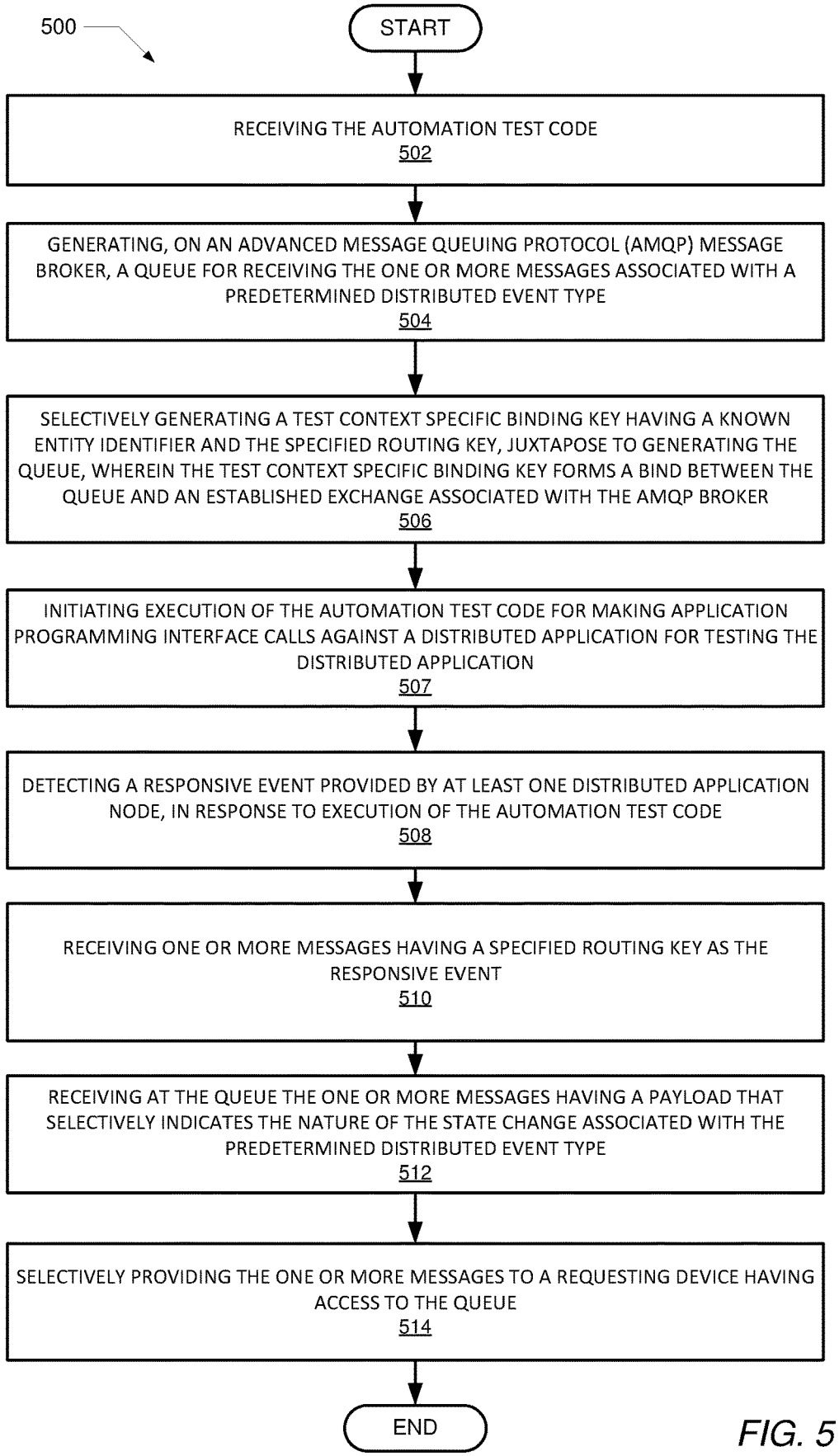
FIG. 5 is a flow chart illustrating an example of a method for testing an asynchronous distributed application and selectively routing one or more messages to an established exchange, according to one or more embodiments.

FIG. 5 illustrates a flowchart of exemplary methods 500 and 600 by which processor 105 within the preceding figures performs different aspects of the processes that enable the one or more embodiments of the disclosure. Generally, method 500 and 600 represents computer-implemented methods for testing an asynchronous distributed application. The descriptions of method 500 and 600 are provided with general reference to the specific components illustrated within the preceding FIGS. 1-4. Method 500 and 600 are described as being implemented via processor 105 and particularly the execution of code provided by BDTM 122 executed by processor 105. It is however appreciated that certain aspects of the described methods may be implemented via other processing devices and/or execution of other code.

Turning now to FIG. 5, method 500 begins at the start block and proceeds to block 502. At block 502, the processor receives the automation test code. A queue for receiving the one or more messages associated with a predetermined distributed event type is generated on an AMQP message broker (block 504). At block 506 a test context specific binding key having a known entity identifier and the specified routing key is selectively generated, juxtapose to generating the queue, wherein the test context specific binding key forms a bind between the queue and an established exchange associated with the AMQP broker. The processor initiates execution of the automation test code for making Application Programming Interface calls against a distributed application for testing the distributed application (block 507). At block 508, processor 105 detects a responsive event provided by at least one distributed application node, in response to execution of the automation test code. One or more messages having a specified routing key are received as the responsive event, at block 510. The processor receives, at the queue, the one or more messages having a payload that selectively indicates the nature of the state change associated with the predetermined distributed event type (block 512). The one or more messages are selectively provided to a requesting device having access to the queue (block 514) The process concludes at the end block.

Figure 6:
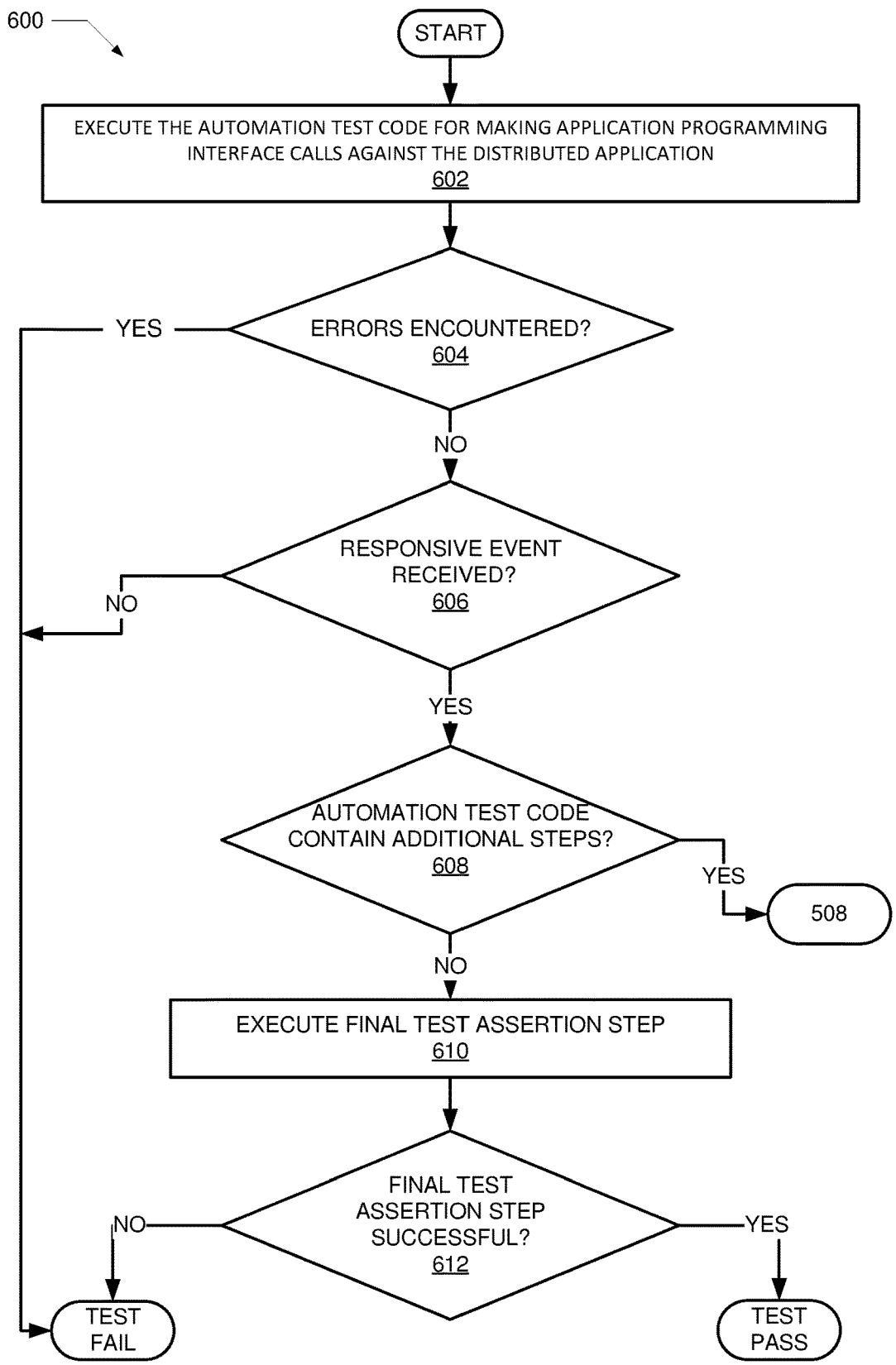
FIG. 6 is a flow chart illustrating an example of a method for making application programming interface calls against an asynchronous distributed application for testing the asynchronous distributed application, according to one or more embodiments.

Turning now to FIG. 6, method 600 begins at the start block and proceeds to block 602. At block 602 the processor executes the automation test code for making application programming interface calls against the distributed application. A decision is made, at block 604, whether errors are encountered during the execution of the automation test code. In response to errors being encountered, the test fails. In response to no errors being encountered, the process continues to block 606. At block 606 a decision is made whether the responsive event (one or more messages) is received. In response to the responsive event not being received the test fails. In response to the responsive event being received the process continues to block 608. A decision is made at block 608 whether the automation code contains additional continuation steps. In response to the process containing additional continuation steps, the process returns to block 508 of FIG. 5. In response to the process not containing additional continuation steps, the process continues to block 610. At block 610, the processor executes the final test assertion step. At block 612 a decision is made whether the final test assertion step is successful. In response to the final test assertion step being successful, the test passes. In response to the final test assertion step not being successful, the test fails.

In the above described flow chart, the method may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method in an information handling system (IHS) for testing an asynchronous distributed application, the method comprising:

receiving the automation test code;
generating, on an advanced message queuing protocol (AMQP) message broker, a queue for receiving one or more messages associated with a predetermined distributed event type;
selectively generating a test context specific binding key having a known entity identifier and a specified routing key, juxtapose to generating the queue, wherein the test context specific binding key forms a bind between the queue and an established exchange associated with the AMQP broker;
initiating execution of the automation test code for making Application Programming Interface calls against the distributed application for testing the distributed application;
detecting a responsive event provided by at least one distributed application node, in response to execution of the automation test code;
as the responsive event, receiving the one or more messages having the specified routing key and a payload that selectively indicates a nature of a state of change associated with the predetermined distributed event type;
receiving at the queue the one or more messages; and
selectively providing the one or more messages to a requesting device, of the at least one distributed application node, having access to the queue.

2. The method of claim 1, further comprising generating the automation test code to provide programmatic commands to the at least one distributed application node from among a plurality of distributed application nodes, wherein an Application Programming Interface provides the programmatic commands.

3. The method of claim 1, wherein detecting the responsive event identifies a resulting domain entity state change for the predetermined distributed event type.

4. The method of claim 3, further comprising:
in response to identifying the resulting domain entity state change, generating a sequence of continuation steps in automation test code form; and
providing the sequence of continuation steps in automation test code form to the at least one distributed application node to generate a subsequent domain entity state change.

5. The method of claim 4, further comprising:
in response to detecting the subsequent domain entity state change, provide a corresponding subsequent operation to the automation test code; and
providing a final assertion step to the automation test code in response to detecting an end of the sequence of continuation steps associated with the automation test code.

6. The method of claim 1, further comprises generating the test context specific binding key to have properties that correspond to the automation test code and a known entity, wherein the known entity is designated by the known entity identifier.

7. The method of claim 1, further comprising:
generating the test context specific binding key from the specified routing key having a dynamically identified component therein; and
replacing the dynamically identified component with a parameter that corresponds to a known entity associated with predetermined distributed event.

8. The method of claim 1, further comprising:
receiving the automated test code as a series of discrete operations; and
selectively arranging the series of discrete operations to provide to the at least one distributed application node to assess at least one functional feature of the distributed application.

9. The method of claim 8, further comprises dynamically receiving, at the queue, a responsive message associated with each event of a series of distributed events, in response to execution of the series of discrete operations.

10. The method of claim 9, further comprising:
in response to receipt of the responsive message, providing subsequent discrete operations in automation test code form; and
generating a subsequent queue to receive subsequent messages from the established exchange.

11. An information handling system (IHS) comprising:
a processor communicatively coupled to an advanced message queuing protocol (AMQP) message broker, and which executes a behavior driven testing module (BDTM) to enable the processor to:
receive automation test code;
generate, on the advanced message queuing protocol (AMQP) message broker, a queue for receiving one or more messages associated with a predetermined distributed event type;
selectively generate a test context specific binding key having a known entity identifier and a specified routing key, juxtapose to generating the queue, wherein the test context specific binding key forms a bind between the queue and an established exchange associated with the AMQP broker;
initiate execution of the automation test code for making an application programming interface call against a distributed application for testing the distributed application;
detect a responsive event provided by at least one distributed application node, in response to execution of the automation test code;
as the responsive event, receive the one or more messages having the specified routing key and a payload that selectively indicates a nature of a state of change associated with the predetermined distributed event type;
receive at the queue the one or more messages; and
selectively provide the one or more messages to a device, of the at least one distributed application node, that accesses the queue.

12. The IHS of claim 11, further comprises generating the automation test code to provide programmatic commands to the at least one distributed application node from among a plurality of distributed application nodes, wherein an Application Programming Interface provides the programmatic commands.

13. The IHS of claim 11, wherein detection of the responsive event further comprises identifying a resulting domain entity state change for the predetermined distributed event type.

14. The IHS of claim 13, wherein the processor:
generates a sequence of continuation steps to provide to the automation test code, in response to identifying the resulting domain entity state change; and
provides the automation test code to the at least one distributed application node to generate a subsequent domain entity state change.

15. The IHS of claim 14, wherein the processor:
provides a corresponding subsequent operation to the automation test code, in response to detection of the subsequent domain entity state change; and
provides a final assertion step to the automation test code in response to detection of an end of the sequence of continuation steps associated with the automation test code.

16. The IHS of claim 11, further comprises generating the test context specific binding key to have properties that correspond to the automation test code and a known entity, wherein the known entity is designated by the known entity identifier.

17. IHS of claim 11, wherein the processor:
generates the test context specific binding key from the specified routing key having a having a dynamically identified component therein; and
replaces the specified routing key having the dynamically identified component with a parameter that corresponds to a known entity associated with predetermined distributed event.

18. The IHS of claim 11, wherein the processor:
receives the automated test code as a series of discrete operations; and
selectively arranges the series of discrete operations to provide to the at least one distributed application node to assess at least one functional feature of the distributed application, wherein the at least one functional feature is dynamically detected.

19. The IHS of claim 18, wherein the processor receives, at the queue, a responsive message associated with each event of a series of distributed events, in response to execution of the series of discrete operations.

20. The IHS of claim 19, wherein the processor:
provides subsequent discrete operations to the automated test code, in response to receipt of the responsive message; and
generate a subsequent queue to receive subsequent messages from the established exchange.

* * * * *